US011391846B2

(12) United States Patent
Jones et al.

(10) Patent No.: US 11,391,846 B2
(45) Date of Patent: Jul. 19, 2022

(54) GLOBAL NAVIGATION SATELLITE SYSTEM (GNSS) ANTI-SPOOFING TECHNIQUES BASED ON SIMILARITIES OF GAIN VECTORS

(71) Applicant: Raytheon Systems Limited, Harlow (GB)

(72) Inventors: Michael Jones, Andover (GB); Michael C. Wells, Landford (GB); Steven Clark, Harlow (GB)

(73) Assignee: Raytheon Systems Limited, Harlow (GB)

( * ) Notice: Subject to any disclaimer, the term of this patent is extended or adjusted under 35 U.S.C. 154(b) by 0 days.

(21) Appl. No.: 17/066,106

(22) Filed: Oct. 8, 2020

(65) Prior Publication Data
US 2021/0109227 A1  Apr. 15, 2021

(30) Foreign Application Priority Data
Oct. 11, 2019  (GB) ..................................... 1914762

(51) Int. Cl.
*G01S 19/21*  (2010.01)
(52) U.S. Cl.
CPC ................................. *G01S 19/215* (2013.01)
(58) Field of Classification Search
CPC .................................................. G01S 19/215
See application file for complete search history.

(56) References Cited

U.S. PATENT DOCUMENTS

| 5,694,416 | A  | 12/1997 | Johnson |
| 7,250,903 | B1 | 7/2007  | McDowell |
| 7,304,605 | B2 | 12/2007 | Wells |
| 7,494,090 | B2 | 2/2009  | Leal et al. |

(Continued)

FOREIGN PATENT DOCUMENTS

| EP | 2662706 A1 | 11/2013 |
| EP | 3428688 A1 | 1/2019 |

(Continued)

OTHER PUBLICATIONS

Lo et al., "Robust GNSS Spoof Detection using Direction of Arrival: Methods and Practice," Proceedings of the 31st International Technical Meeting of The Satellite Division of the Institute of Navigation, Oct. 2018, 16 pages.

(Continued)

*Primary Examiner* — Cassi J Galt

(57) ABSTRACT

A system for identifying spoofed navigation signals includes a multi-element antenna configured to receive a plurality of navigation signals. The system also includes at least one processor configured to obtain a gain vector for each of the navigation signals and analyze the gain vectors for the navigation signals to determine whether one or more of the navigation signals are spoofed. To analyze the gain vectors for the navigation signals, the at least one processor may be configured to (i) determine whether at least a specified number of the navigation signals have substantially the same gain vectors and (ii) in response to determining that at least the specified number of the navigation signals have substantially the same gain vectors, determine that the navigation signals having substantially the same gain vectors are spoofed.

22 Claims, 7 Drawing Sheets

(56) References Cited

U.S. PATENT DOCUMENTS

| | | | |
|---|---|---|---|
| 7,952,519 | B1 | 5/2011 | Nielsen et al. |
| 8,825,399 | B2 | 9/2014 | Vance |
| 9,725,171 | B1 | 8/2017 | Carmack et al. |
| 9,952,325 | B2 | 4/2018 | Fernandez-Hernandez |
| 10,024,973 | B1 | 7/2018 | Alexander et al. |
| 10,031,234 | B1 | 7/2018 | Alexander |
| 10,081,416 | B2 | 9/2018 | Elder |
| 10,162,060 | B2 | 12/2018 | Jaeckle |
| 10,725,182 | B2 | 7/2020 | Boyer et al. |
| 11,119,221 | B2 | 9/2021 | Cohen et al. |
| 2012/0286994 | A1 | 11/2012 | Letestu et al. |
| 2013/0090078 | A1 | 4/2013 | Martin et al. |
| 2013/0162470 | A1 | 6/2013 | Rousu et al. |
| 2014/0292576 | A1* | 10/2014 | Martin .......... G01S 19/215 342/357.59 |
| 2015/0123846 | A1 | 5/2015 | Jeong et al. |
| 2016/0146944 | A1 | 5/2016 | Geren et al. |
| 2017/0227650 | A1 | 8/2017 | Grobert |
| 2018/0196141 | A1 | 7/2018 | Dickerson et al. |
| 2018/0356234 | A1 | 12/2018 | Wilby et al. |

FOREIGN PATENT DOCUMENTS

| | | | |
|---|---|---|---|
| GB | 2534654 | A | 8/2016 |
| WO | 2015142985 | A1 | 9/2015 |

OTHER PUBLICATIONS

Humphreys et al., "Assessing the Spoofing Threat—GPS World," GPS World, Jan. 2009, 41 pages.
Raytheon Co., "Innovation for New Markets," Raytheon UKnews, Spring 2014, 12 pages.
Raytheon Co., "Landshield GPS Anti-Jam Antenna," Specification Sheet, Mar. 2019, 1 page.
U.S. Appl. No. 16/918,934 entitled "Autonomous Vehicles Supporting Global Navigation Satellite System (GNSS) Anti-Spoofing" filed Jul. 1, 2020, 45 pages.
U.S. Appl. No. 16/918,860 entitled "Global Navigation Satellite System (GNSS) Anti-Spoofing Techniques" filed Jul. 1, 2020, 46 pages.
Combined Search and Examination Report in connection with UK Patent Application No. GB1909572.8 dated Dec. 5, 2019, 8 pages.
Combined Search and Examination Report in connection with UK Patent Application No. GB1909576.9 dated Dec. 4, 2019, 7 pages.
Non-Final Office Action dated Sep. 8, 2021 in connection with U.S. Appl. No. 16/918,860, 11 pages.
Combined Search and Examination Report in connection with UK Patent Application No. GB1914762.8 dated Apr. 14, 2020, 9 pages.
Search and Examination Report in connection with UK Patent Application No. GB 1909572.8 dated Aug. 31, 2021, 6 pages.
Examination Report in connection with UK Patent Application No. GB 1909576.9 dated Oct. 20, 2021, 4 pages.
Final Office Action dated Dec. 27, 2021, in connection with U.S. Appl. No. 16/918,860, 14 pages.

* cited by examiner

GLOBAL NAVIGATION SATELLITE SYSTEM (GNSS) ANTI-SPOOFING TECHNIQUES BASED ON SIMILARITIES OF GAIN VECTORS

CROSS-REFERENCE TO RELATED APPLICATION AND PRIORITY CLAIM

This application claims priority under 35 U.S.C. § 119 to United Kingdom Patent Application No. 1914762.8 filed on Oct. 11, 2019, which is hereby incorporated by reference in its entirety.

TECHNICAL FIELD

This disclosure relates generally to satellite navigation systems. More specifically, this disclosure relates to methods and devices for detecting and counteracting spoofed global navigation satellite system (GNSS) signals based on similarities of gain vectors.

BACKGROUND

A global navigation satellite system (GNSS) uses satellites to support geo-spatial positioning. A GNSS receiver typically receives signals from multiple GNSS satellites and uses known positions of the GNSS satellites to calculate a position of the receiver. One example of a GNSS system is the Global Positioning System (GPS), which uses a constellation of satellites that continuously transmit their current positions and their current times as held by atomic clocks on-board the satellites. A GPS receiver monitors the signals from multiple GPS satellites and uses the positions and times transmitted by the satellites to determine its position. Typically, a minimum of four signals from four GPS satellites need to be received in order to calculate the position of a GPS receiver in three-dimensional space and to correct for deviation of the receiver's internal clock from the satellites' clocks.

Global navigation satellite systems such as GPS are widely used in various civilian and military applications. This makes global navigation satellite systems a regular target for attack by adversaries or other illicit actors hoping to disrupt economic, military, or other activities. One mode of attack is to "spoof" GNSS satellite signals, such as by transmitting fake GNSS signals with incorrect position or time information, in order to disrupt a receiver's ability to determine its position accurately.

GNSS signals are typically very weak at ground-level, often around −125 dBm down to −150 dBm or even lower. This makes it particularly easy for attackers or other illicit actors to broadcast spoofed GNSS signals at higher signal strengths over large areas that drown out genuine GNSS signals at receivers. Existing anti-spoofing systems often rely on a comparison of a received signal strength of a GNSS signal with an expected signal strength. If the received signal strength is significantly stronger than expected for a GNSS signal, the received signal is unlikely to be a genuine GNSS signal. However, in a targeted attack or when a genuine GNSS signal is particularly weak, it may not be necessary for a spoofed GNSS signal to be significantly stronger than expected to be effective.

SUMMARY

This disclosure provides global navigation satellite system (GNSS) anti-spoofing techniques based on similarities of gain vectors.

In a first embodiment, a method for identifying spoofed navigation signals includes receiving a plurality of navigation signals at a multi-element antenna. The method also includes determining a gain vector for each of the navigation signals and analyzing the gain vectors for the navigation signals to determine whether one or more of the navigation signals are spoofed.

In a second embodiment, a system for identifying spoofed navigation signals includes a multi-element antenna configured to receive a plurality of navigation signals. The system also includes at least one processor configured to obtain a gain vector for each of the navigation signals and analyze the gain vectors for the navigation signals to determine whether one or more of the navigation signals are spoofed.

In a third embodiment, a non-transitory computer-readable medium includes instructions that, when executed by at least one processor, cause the at least one processor to determine a gain vector for each of a plurality of navigation signals received by a multi-element antenna. The medium also includes instructions that, when executed by the at least one processor, cause the at least one processor to analyze the gain vectors for the navigation signals to determine whether one or more of the navigation signals are spoofed.

In some embodiments, the gain vector for each of the navigation signals can be determined by, in each of multiple tracking channels, mixing the navigation signals as received by different elements of the multi-element antenna with an oscillator signal to produce first mixed signals, mixing the first mixed signals with a navigation code to produce second mixed signals, and accumulating values of the second mixed signals to produce accumulated values that form a vector of values. The gain vector for one of the navigation signals is determined using or is based on the vector of values. Different tracking channels use different navigation codes.

In some embodiments, the gain vectors for the navigation signals are analyzed by (i) determining whether at least a specified number of the navigation signals have substantially the same gain vectors and (ii) in response to determining that at least the specified number of the navigation signals have substantially the same gain vectors, determining that the navigation signals having substantially the same gain vectors are spoofed. Two of the gain vectors may be substantially the same when a squared cross-correlation magnitude between the two gain vectors exceeds a specified threshold.

In some embodiments, information about expected or actual positions of satellites associated with the navigation signals can be received, and the information can be used to identify the navigation signals and/or analyze the gain vectors. The information about the expected or actual positions of the satellites may include a navigation almanac and/or ephemerides.

In some embodiments, a signal strength of each of the navigation signals can be compared to an expected signal strength. The expected signal strength may be −120 dBm or lower.

In some embodiments, any of the navigation signals determined to be spoofed can be suppressed. Also, a position can be calculated using the navigation signals determined not to be spoofed, and/or the navigation signals determined not to be spoofed can be re-transmitted to a navigation receiver. Re-transmitting the navigation signals may include multiplexing the navigation signals determined not to be spoofed and re-transmitting the multiplexed navigation signals on a same carrier frequency or frequencies on which the navigation signals were received by the multi-element antenna.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

FIGS. 1 through 8, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, global navigation satellite system (GNSS) signals are generally weak and are often subject to spoofing attempts by adversaries or other illicit actors hoping to disrupt economic, military, or other activities. One type of spoofing attempt involves transmitting fake GNSS satellite signals with incorrect position or time information in order to disrupt a GNSS receiver's ability to determine its position accurately. Approaches that rely on comparing a received signal strength of a GNSS signal with an expected signal strength can suffer from various shortcomings and are not always effective.

This disclosure provides various anti-spoofing techniques for GNSS receivers. As described in more detail below, a receiver includes a multi-element antenna and a signal processor. The antenna includes multiple antenna elements that can receive GNSS signals (real and spoofed), and the signal processor can perform signal processing techniques to identify a gain vector (such as a complex gain vector) for each GNSS signal. The gain vectors for the GNSS signals can be used to identify any GNSS signals that may be spoofed. The signal processor processes the legitimate GNSS signals or causes the legitimate GNSS signals to be output to another component for processing, and any spoofed GNSS signals can be suppressed. In this way, these techniques help to reduce the ability of adversaries or other illicit actors to disrupt the use of a GNSS by spoofing GNSS signals.

Figure 1:
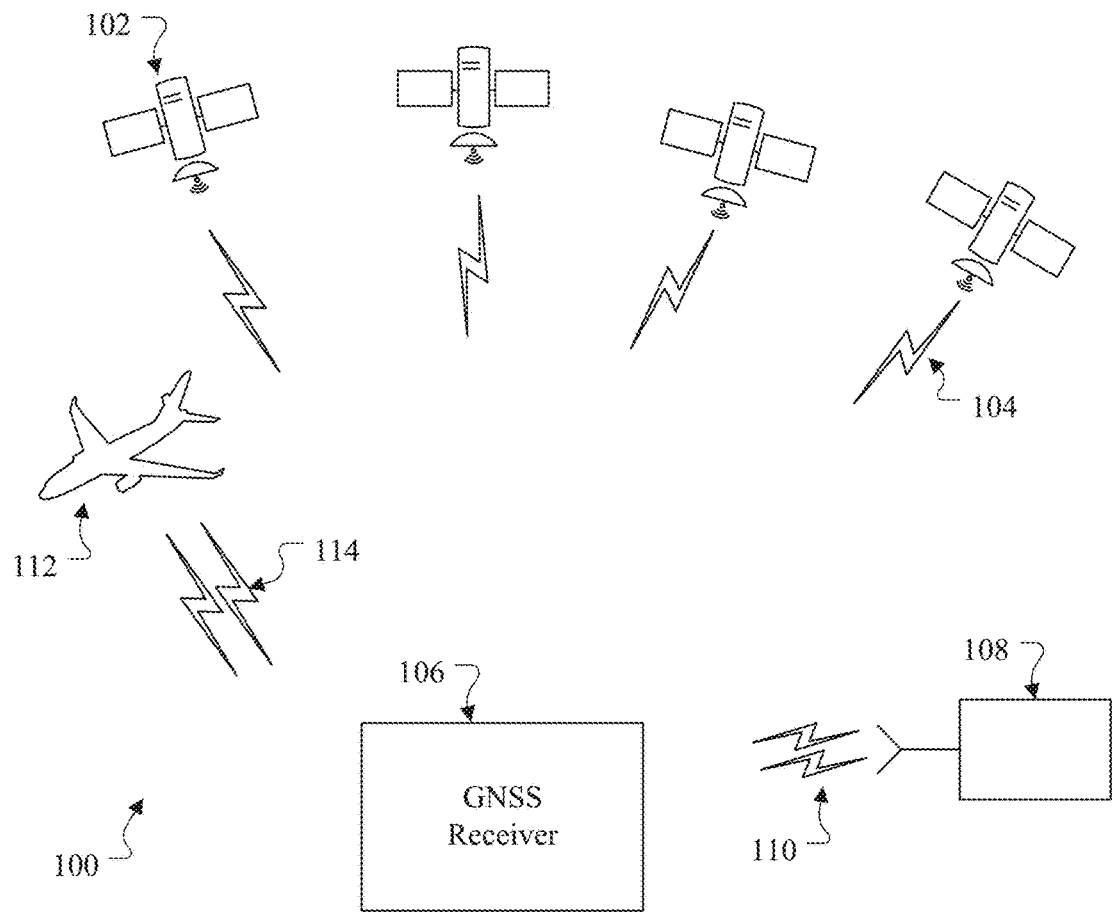
FIG. 1 illustrates an example global navigation satellite system (GNSS) according to this disclosure.

FIG. 1 illustrates an example global navigation satellite system (GNSS) 100 according to this disclosure. As shown in FIG. 1, the GNSS 100 includes multiple satellites 102, where the satellites 102 transmit wireless position signals 104. The satellites 102 here support any suitable satellite navigation system, such as the Global Positioning System (GPS), Global Navigation Satellite System (GLONASS), Galileo system, BeiDou system, or other global/regional system for navigation that uses a constellation of satellites (now known or later developed/deployed). Each satellite 102 includes any suitable structure configured to transmit position signals 104 from orbit.

The position signals 104 contain any suitable content. In some embodiments, for example, the position signals 104 transmitted by each satellite 102 includes the current position of that satellite 102 and the current time held by an atomic clock on-board that satellite 102. As a particular example, the position signals 104 transmitted by each satellite 102 may include the current time of that satellite's atomic clock, ephemerides, and an almanac. Ephemerides very accurately describe the current positions of the satellites 102, but ephemerides are valid for shorter periods of time (such as four hours). The almanac coarsely describes the positions of the satellites 102 and therefore contains less-accurate orbital information than the ephemerides, but the almanac is valid for longer periods of time (such as up to 90 days). The almanac is often used to initially identify the approximate positions of the satellites 102, and the ephemerides are then used after that. Of course, any other or additional information may be included in the position signals 104.

As shown in this example, a receiver 106 receives the position signals 104 from the satellites 102 and uses the position signals 104 to identify its geo-spatial location. This may occur in any suitable manner, including those techniques now known or later developed. The receiver 106 may be used in any number of devices or systems that may operate based on or using the geo-spatial location of the receiver 106. For example, the receiver 106 may be used in civilian or military land vehicles (such as cars, trucks, and semi-trucks), autonomous vehicles (such as autonomous passenger vehicles, autonomous shuttles or buses, or other autonomous vehicles), handheld devices, civilian or military ships or other vessels, or civilian or military drones, aircraft, rockets, missiles, or other flight vehicles.

As shown in FIG. 1, the receipt and use of the position signals 104 by the receiver 106 can be affected by one or more adversaries or other illicit actors. For example, one or more spoofing transmitters 108 on the ground may be used to generate and transmit spoofed position signals 110, and/or one or more spoofing transmitters 112 in the air may be used to generate and transmit spoofed position signals 114. The spoofed position signals 110, 114 may contain at least one type of inaccurate data, such as incorrect time information or incorrect position information (like incorrect ephemerides or an incorrect almanac). The spoofed position signals 110, 114 may be broadcast over a large area or targeted to a well-defined area or even to a specific device or system. Without anti-spoofing capabilities, the spoofed position signals 110, 114 interfere with proper operation of the receiver 106 and may interfere with or prevent the receiver 106 from accurately identifying its position.

This disclosure recognizes that it is relatively common for a single spoofer to transmit multiple spoofed position signals 110, 114 from the same general location. For example, a single spoofing transmitter 108 on the ground or a single spoofing transmitter 112 in the air might be used to transmit multiple spoofed position signals 110, 114 that are allegedly from different satellites 102. While it is possible for valid wireless position signals 104 to be received from multiple satellites 102 having similar lines-of-sight with respect to the GNSS receiver 106 (such as when the satellites 102 have similar locations in the sky from the perspective of the GNSS receiver 106), it is much more common for the receiver 106 to receive valid wireless position signals 104 from substantially different directions.

As described in more detail below, the receiver 106 includes an antenna formed using multiple antenna elements, which can receive GNSS signals (such as legitimate position signals 104 and any spoofed position signals 110, 114). The receiver 106 performs signal processing to generate gain vectors, such as complex gain vectors, that are based on the GNSS signals received by the different antenna elements of the antenna. The receiver 106 uses the identified gain vectors for the GNSS signals to determine whether it appears spoofing is being attempted. For example, the receiver 106 may calculate the squared cross-correlation magnitude between each pair of gain vectors and compare each squared cross-correlation magnitude value to a threshold value. A squared cross-correlation magnitude value that exceeds the threshold may indicate that a spoofer is transmitting multiple GNSS signals from the same location. If any spoofed position signals 110, 114 are detected, the receiver 106 can discard, block, or otherwise suppress the spoofed position signals 110, 114 and use only legitimate position signals 104. The receiver 106 could also provide one or more gain vectors associated with actual or potential spoofing to a direction finding algorithm, which determines a direction to the actual or potential spoofer relative to the receiver 106. Gain vectors or directions from multiple receivers 106 can also be used to geo-locate the actual or potential spoofer, such as via triangulation or other technique based on the positions of the receivers 106 and the identified directions to the actual or potential spoofer.

Note that it is also possible for the receiver 106 to incorporate one or more additional analyses when determining whether one or more GNSS signals are legitimate. For example, as noted above, GNSS signals are typically very weak at ground-level, often around −125 dBm down to −150 dBm or even lower. Thus, the receiver 106 may measure the received signal strength of each GNSS signal and compare the received signal strength to a threshold, such as −120 dBm or lower, to determine whether the GNSS signal may represent a legitimate signal. As another example, the receiver 106 may determine if received GNSS signals contain substantially different ephemerides or almanac compared to other received GNSS signals.

As yet another example, the receiver 106 may determine if gain vectors for received GNSS signals correspond to expected gain vectors based on known or expected satellite positions. Determining whether the gain vectors for the received GNSS signals correspond to the expected gain vectors can include using knowledge of satellite locations (which can be based on received or stored ephemerides or almanac) to determine if the gain vectors for the received GNSS signals are substantially similar to expected gain vectors. The expected gain vectors can be determined based on platform attitude (which identifies the attitude of a multi-element antenna of the receiver 106 relative to the horizon), a rough location of the receiver 106 (unless azimuths and elevations can be obtained such as from a GNSS receiver), and an antenna array manifold (which identifies how gains and phases of the multi-element antenna vary with direction). Based on this information, expected gain vectors can be estimated for any satellites 102 that should be visible to the receiver 106, and the similarities of these expected gain vectors to the gain vectors for the received GNSS signals can be determined (such as based on squared cross-correlation magnitude). Here, higher similarities would indicate that received GNSS signals have gain vectors that are more similar to expected gain vectors.

The receiver 106 can use any GNSS signal that is determined to be legitimate in order to identify a position of the receiver 106, meaning any GNSS signal that is determined not to be spoofed. For example, the receiver 106 can block any GNSS signal that is determined to be a spoofed signal, such as by applying amplitude and phase weightings to different channels (different antenna elements) and combining the resulting signals to optimize the reception of legitimate signals and to suppress potential or actual spoofed signals. In some embodiments, the receiver 106 can use the optimized legitimate signals to calculate a position of the receiver 106. In other embodiments, the receiver 106 can multiplex the optimized legitimate signals (those GNSS signals determined not to be spoofed) and re-transmit the multiplexed signals on the same carrier frequency or frequencies as the GNSS signals received by the antenna. This may allow, for example, another component of the receiver 106 (such as a standard GNSS receiver) to receive the optimized legitimate signals only and to determine a position of the receiver 106 based on those signals.

By incorporating the consideration of gain vectors into GNSS anti-spoofing operations, the receiver 106 can more effectively combat GNSS spoofing. For example, the receiver 106 can more easily detect if and when one or more spoofing transmitters (either on the ground or in the air) are transmitting or broadcasting multiple GNSS signals. Also, one potential advantage here over other approaches (such as those that compare angles of arrival for received GNSS signals) is that the approaches described in this patent document have little or no concerns regarding multipath interference. Multipath interference refers to interference caused when a transmitted signal follows multiple paths from a transmitter to a receiver, which is caused by reflections of the transmitted signal and results in multiple versions of the same transmitted signal being received at slightly different times at the receiver. It may be more difficult for a receiver to compare angles of arrival for received GNSS signals when those GNSS signals may undergo one or multiple reflections prior to receipt by the receiver. In the approaches described in this patent document, however, multipath interference would not be a significant issue since multiple spoofed signals transmitted from the same location should experience substantially the same multipath interference. As a result, the resulting gain vectors for those spoofed signals should ideally still be substantially the same, allowing detection and suppression of the spoofed signals even in the presence of multipath interference.

Although FIG. 1 illustrates one example of a GNSS 100, various changes may be made to FIG. 1. For example, any number of receivers 106 may be used with a GNSS 100. Also, the GNSS 100 may include any suitable number of satellites 102 in any suitable configuration, and the satellites 102 that are visible to any given receiver 106 at any specific time can vary. In addition, depending on the circumstances, there may be any number of spoofing transmitters on the ground or in the air for a given environment.

Figure 2:
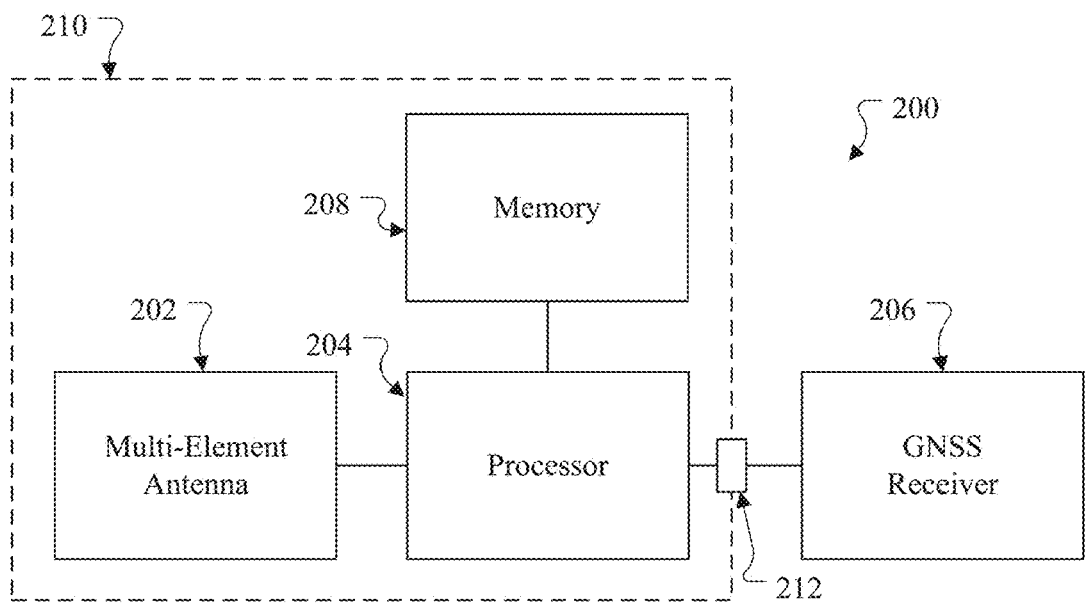
FIG. 2 illustrates an example device supporting GNSS anti-spoofing based on similarities of gain vectors according to this disclosure.

FIG. 2 illustrates an example device 200 supporting GNSS anti-spoofing based on similarities of gain vectors according to this disclosure. The device 200 shown in FIG. 2 may, for example, represent one possible implementation of part or all of the receiver 106 in the GNSS 100 of FIG. 1. However, the device 200 may be used in any other suitable system.

As shown in FIG. 2, the device 200 generally includes a multi-element antenna 202 and a processor 204. The device 200 may also include a GNSS receiver 206 and a memory 208. The multi-element antenna 202 represents an antenna that includes multiple antenna elements, which can be arranged in various ways. For example, the multi-element antenna 202 may represent an antenna having two antenna elements that are spaced apart by a known distance. As another example, the multi-element antenna 202 may represent an antenna having four antenna elements, such as a first two-element antenna and a second two-element antenna arranged orthogonally, with known distances separating the various antenna elements. Any other suitable number of antenna elements (such as seven or more antenna elements) in any suitable configuration can be used here. The multi-element antenna 202 includes any suitable structure containing multiple antenna elements configured to receive wireless signals. Note that a multi-element antenna 202 can include a single antenna having multiple antenna elements, separate antennas each having one or more antenna elements, or any suitable combination thereof.

The multi-element antenna 202 is in electrical communication with the processor 204, which processes the received signals. In some embodiments, various components may be positioned between the multi-element antenna 202 and the processor 204 to pre-process the received signals. These components may include one or more filters (such as low-pass, band-pass, high-pass, or surface acoustic wave or "SAW" filters) and one or more amplifiers (such as low-noise amplifiers or "LNAs"), which can be used to clean and amplify GNSS signals before they are received by the processor 204. In other embodiments, the processor 204 itself may include any necessary or desired filtering, amplification, or other pre-processing functionality.

GNSS signals are received by the multi-element antenna 202 and transmitted to the processor 204. As described in more detail below, the processor 204 analyzes the GNSS signals to determine whether any of the GNSS signals received via the multi-element antenna 202 are spoofed GNSS signals (such as from one or more spoofing transmitters 108, 112 on the ground or in the air). The processor 204 may also discard, block, or otherwise counteract any spoofed GNSS signals. In some embodiments, once the spoofed GNSS signals have been discarded, blocked, or otherwise removed, the processor 204 may transmit only genuine GNSS signals to the GNSS receiver 206 for use in calculating a position. In other embodiments, the processor 204 itself may use the genuine GNSS signals to calculate a position.

The processor 204 includes any suitable processing device or devices configured to analyze at least GNSS signals to identify and suppress spoofed GNSS signals. For example, the processor 204 may include one or more microprocessors, microcontrollers, digital signal processors (DSPs), field programmable gate arrays (FPGAs), application specific integrated circuits (ASICs), or discrete circuits. In some embodiments, the processor 204 is used exclusively to identify and suppress spoofed GNSS signals. In other embodiments, the processor 204 can be used to perform other functions associated with the device 200 or with a larger device or system in which the device 200 is used, such as identifying a direction to a potential or actual spoofer.

The GNSS receiver 206 may be used to process received GNSS signals and identify a location of the device 200. For example, the GNSS receiver 206 may use the position and timing information contained in legitimate position signals 104 to identify a geo-spatial location of the device 200. The GNSS receiver 206 includes any suitable structure configured to process GNSS signals, such as a GPS, GLONASS, Galileo, or BeiDou receiver. As noted above, the GNSS receiver 206 is optional in the device 200 since the functionality of the GNSS receiver 206 may be incorporated into or performed by the processor 204.

The memory 208 is coupled to the processor 204 and can be used to store and facilitate retrieval of instructions and data used, generated, or collected by the processor 204. For example, the memory 208 may be used to store ephemerides and an almanac received by the device 200 from one or more GNSS satellites 102. The memory 208 represents any suitable volatile or non-volatile storage and retrieval device or devices, such as random access memory, read only memory, Flash memory, optical disc, or hard drive. Note, however, that the memory 208 may be incorporated into the processor 204 so that a separate memory is not required in the device 200.

In some embodiments, the multi-element antenna 202 and the processor 204 (and optionally the memory 208) can be used as a drop-in replacement for a conventional antenna connected to a GNSS receiver 206. For example, in particular embodiments, the multi-element antenna 202 and the processor 204 (and optionally the memory 208) may form a replacement antenna unit 210. The replacement antenna unit 210 may include one or more standard antenna attachments or other electrical connectors 212 in order to connect to a separate GNSS receiver 206, such as when the one or more electrical connectors 212 can be coupled to an antenna connection of the GNSS receiver 206. The output of the replacement antenna unit 210 is essentially the same as the output of a conventional antenna, namely multiplexed GNSS signals transmitted on the same frequencies as the original GNSS signals. However, the replacement antenna unit 210 operates to reduce or prevent spoofed GNSS signals from being output. In this way, existing GNSS receivers 206 can be upgraded with anti-spoofing capabilities by simply replacing the existing antenna with the replacement antenna unit 210 (without replacing the entire GNSS receiver system), saving time and resources.

In other embodiments, the processor 204 may be configured to carry out the normal functions of the GNSS receiver 206, such as by calculating the position of the device 200 based on the legitimate GNSS signals while suppressing any spoofed GNSS signals. In that case, a separate GNSS receiver 206 is not required in order to determine a position. In these embodiments, the processor 204 may instead output the determined position, such as via a display device to a user or via a different connection to a separate navigation system or other system, or use the determined position in some other manner.

Although FIG. 2 illustrates one example of a device 200 supporting GNSS anti-spoofing based on similarities of gain vectors, various changes may be made to FIG. 2. For example, the device 200 may include any suitable number of each component in any suitable arrangement. Also, the architecture of the device 200 has been simplified here for ease of illustration and explanation. A device 200 supporting GNSS anti-spoofing functionality may include any number of other components that support any desired functionality in the device 200. In addition, various components shown in FIG. 2 may be combined, further subdivided, or omitted and additional components may be added according to particular needs. As a particular example, the operations performed by the processor 204 do not necessarily need to be carried out by a single device. Some tasks may be off-loaded to one or more other processors (such as one or more microprocessors, microcontrollers, DSPs, ASICs, FPGAs, or built-in GNSS receivers), which can also be part of the replacement antenna unit 210 where appropriate.

Figure 3:
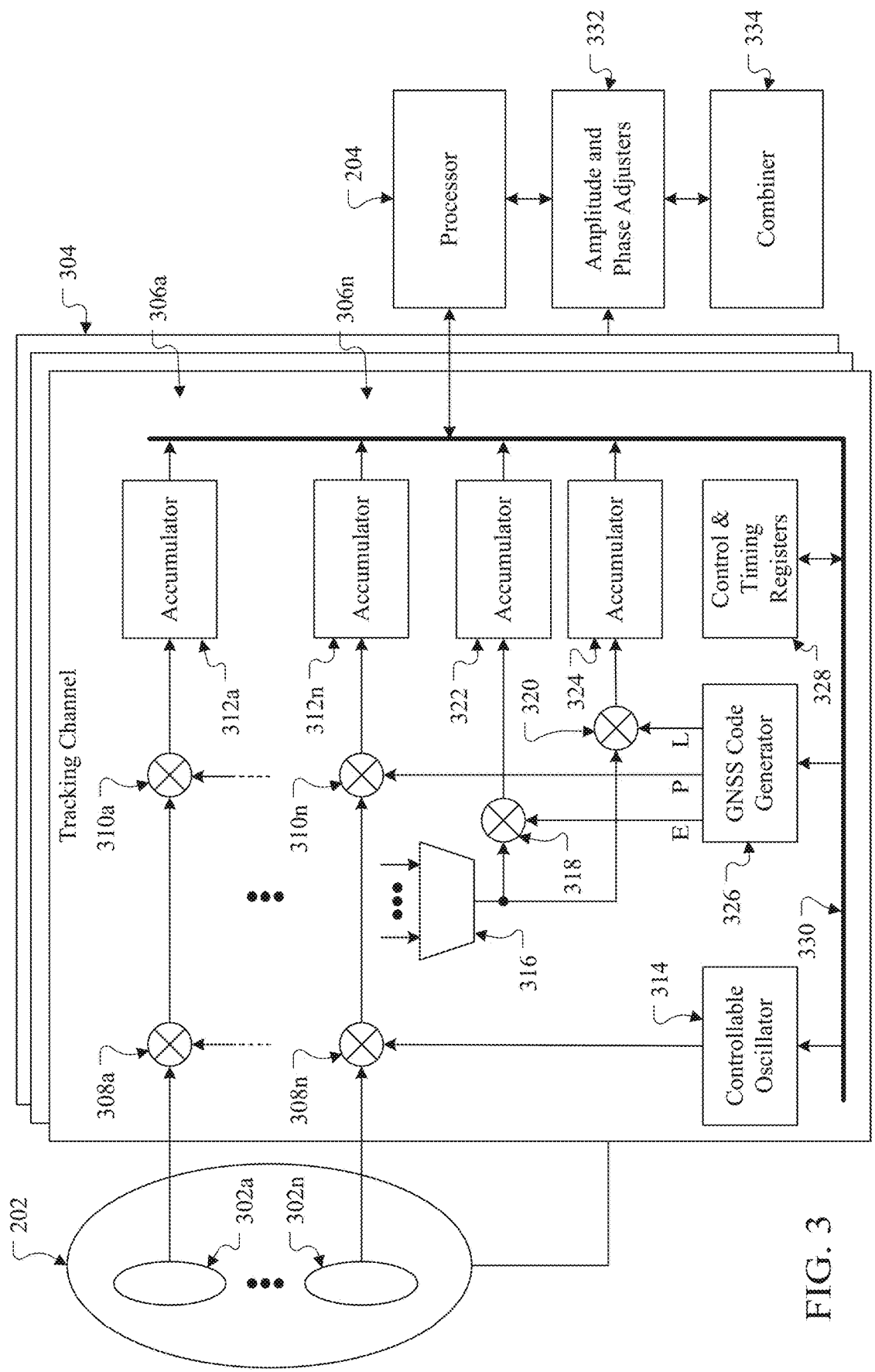
FIG. 3 illustrates example signal processing in a device supporting GNSS anti-spoofing based on similarities of gain vectors according to this disclosure.

FIG. 3 illustrates example signal processing in a device supporting GNSS anti-spoofing based on similarities of gain vectors according to this disclosure. The signal processing shown in FIG. 3 may, for example, be performed in the device 200 of FIG. 2 operating in the GNSS 100 of FIG. 1. However, the signal processing shown in FIG. 3 may be performed by any other suitable device operating in any other suitable system.

As shown in FIG. 3, the multi-element antenna 202 includes multiple antenna elements 302a-302n. Each antenna element 302a-302n represents a separate structure configured to receive at least one wireless signal and to output at least one electrical signal corresponding to the wireless signal. The antenna elements 302a-302n therefore form a spatial array of N elements, where N is an integer greater than or equal to two (and can be much greater than two). The antenna elements 302a-302n can be arranged in various patterns, such as in a one-dimensional, two-dimensional, or three-dimensional arrangement.

Multiple tracking channels 304 receive the electrical signals output by the antenna elements 302a-302n and process the electrical signals to identify GNSS signals. Each tracking channel 304 generally attempts to identify a GNSS signal from a single satellite 102, and different tracking channels 304 generally attempt to identify different GNSS signals from different single satellites 102. However, as noted above, one or more of the tracking channels 304 may identify spoofed GNSS signals, which would otherwise interfere with the operation of a receiver. Using the techniques disclosed in this patent document, these spoofed GNSS signals can be suppressed so that only valid GNSS signals identified by the tracking channels 304 are used. Each tracking channel 304 includes any suitable structure configured to identify GNSS signals. Also, there may be any suitable number of tracking channels 304 provided, possibly up to dozens of tracking channels 304 or more.

Each tracking channel 304 includes multiple signal channels 306a-306n, where each signal channel 306a-306n processes the electrical signals output by a respective one of the antenna elements 302a-302n. Note that all of the tracking channels 304 can receive the same electrical signals output by the antenna elements 302a-302n, so filters, amplifiers, splitters, or other components may be positioned between the antenna elements 302a-302n and the tracking channels 304 as needed. This facilitates the processing of the same signals output from the antenna elements 302a-302n by the different tracking channels 304.

In each tracking channel 304, the signal channels 306a-306n respectively include a first mixer 308a-308n, a second mixer 310a-310n, and an accumulator 312a-312n. Each of the first mixers 308a-308n receives the electrical signal from one of the antenna elements 302a-302n and mixes the electrical signal with an oscillator signal to produce a first mixed signal. Each of the second mixers 310a-310n receives the first mixed signal from one of the first mixers 308a-308n and mixes the first mixed signal with a first GNSS code to produce a second mixed signal. Each of the accumulators 312a-312n integrates or sums values of the second mixed signal over repeated time periods and outputs or "dumps" the accumulated values. When the correct oscillator signal and first GNSS code are used by the mixers 308a-308n and 310a-310n respectively with a specific GNSS signal, the accumulated values generated by the accumulators 312a-312n are much larger (compared to accumulated values generated using an incorrect oscillator signal and/or incorrect first GNSS code), indicating that a GNSS signal (real or spoofed) has been successfully identified. Each mixer 308a-308n and 310a-310n includes any suitable structure configured to mix electrical signals. Each accumulator 312a-312n includes any suitable structure configured to sum and output values.

In this example, the oscillator signal is provided by a controllable oscillator 314. The controllable oscillator 314 generally operates to produce a signal having a frequency that is, at least to some extent, controllable. The controllable oscillator 314 includes any suitable structure configured to generate a signal having a controllable frequency, such as a numerically-controlled oscillator (NCO). Note that the output from the controllable oscillator 314 is provided to all of the mixers 308a-308n in all of the signal channels 306a-306n in the tracking channel 304, thereby ensuring that each signal channel 306a-306n in the tracking channel 304 is using the same oscillator signal during operation.

As shown in FIG. 3, the first mixed signals are also provided to a multiplexer 316, which selectively outputs at least one of the first mixed signals to two additional mixers 318 and 320. The mixer 318 receives the selectively-output first mixed signal and mixes that signal with a second GNSS code to produce a third mixed signal, and an accumulator 322 accumulates or sums values of the third mixed signal over repeated time periods and outputs the accumulated values. The mixer 320 receives the selectively-output first mixed signal and mixes that signal with a third GNSS code to produce a fourth mixed signal, and an accumulator 324 accumulates or sums values of the fourth mixed signal over repeated time periods and outputs the accumulated values. The multiplexer 316 includes any suitable structure configured to selectively output one or more of its input signals. Each mixer 318 and 320 includes any suitable structure configured to mix electrical signals. Each accumulator 322 and 324 includes any suitable structure configured to sum and output values.

In this example, the first GNSS code used by the mixers 310a-310n represents a punctual (P) GNSS code, the second GNSS code used by the mixer 318 represents an early (E) GNSS code, and third GNSS code used by the mixer 320 represents a late (L) GNSS code. These different codes can be used to help align the decoding of a received signal with the punctual GNSS code. As a result, the accumulated values output by the accumulators 322, 324 can be used to help determine whether timing adjustments are needed in order to ensure that a received GNSS signal becomes aligned with and maintains alignment with the punctual GNSS code. The various GNSS codes here are produced by a GNSS code generator 326, which can generate suitable codes for use by a receiver based on the GNSS system in which the receiver operates. The GNSS code generator 326 includes any suitable structure configured to generate GNSS codes for use in identifying GNSS signals. Note that the same first GNSS code from the code generator 326 is provided to all of the mixers 310a-310n in all of the signal channels 306a-306n in the tracking channel 304, thereby ensuring that each signal channel 306a-306n in the tracking channel 304 is using the same first GNSS code during operation.

Various timing and control registers 328 can be used to control the operations of various components in the tracking channel 304. For example, values in the timing and control registers 328 can be used to control the frequency of the oscillator signal generated by the oscillator 314 and the codes generated by the GNSS code generator 326. The timing and control registers 328 in different tracking channels 304 generally have one or more different values in order to support the identification of multiple GNSS signals by the tracking channels 304. The timing and control registers 328 include any suitable structures configured to store and facilitate retrieval of information. A communication bus 330 couples various internal components of the tracking channel 304 and facilitates communication with any desired external components. The communication bus 330 includes any suitable structure supporting communication between components of a GNSS receiver.

In this example, the accumulated values output by the accumulators 312a-312n for all of the tracking channels 304 are provided to the processor 204 for use in spoofing detection. Note that while the tracking channels 304 are shown here as residing outside the processor 204, the tracking channels 304 may also be implemented within the processor 204.

As noted above, the processor 204 can generate or otherwise obtain gain vectors for different GNSS signals. In some embodiments, the gain vector for each GNSS signal can be determined as follows. Assume the accumulated values output by the accumulators 312a-312n in a single tracking channel 304 represent a vector of values for a single GNSS signal, so the accumulated values output by the accumulators 312a-312n in all of the tracking channels 304 represent a collection of vectors for all detected GNSS signals. Given this, the gain vector $g_i$ for the $i^{th}$ individual GNSS signal can be calculated as follows:

$$g_i = \frac{c}{c_{ref}} \quad (1)$$

Here, c represents the vector of values output by the accumulators 312a-312n in the single tracking channel 304 associated with the $i^{th}$ individual GNSS signal. Also, $c_{ref}$ represents the value output by a specified one of the accumulators 312a-312n in the tracking channel 304 associated with the $i^{th}$ individual GNSS signal, where the value from that one accumulator is associated with a reference signal. The reference signal denotes the signal output by one of the antenna elements 302a-302n, which is selected (arbitrarily or otherwise) as a reference. Note, however, that other approaches may be used to generate gain vectors for GNSS signals.

Once the gain vectors have been generated or otherwise obtained for the received GNSS signals, the gain vectors can be compared in order to determine whether two or more gain vectors are substantially equal and therefore may be indicative of spoofing. In some embodiments, the gain vectors for the GNSS signals can be compared as follows. For each distinct pair of gain vectors $g_i$ and $g_j$, calculate the square of the cross-correlation magnitude $G_{ij}$ between the two gain vectors as follows:

$$|G_{ij}|^2 = \frac{|g_i^H g_j|^2}{|g_i|^2 |g_j|^2} \quad (2)$$

where $g_i^H$ represents the complex transpose of the gain vector $g_i$. Here, each squared cross-correlation magnitude value is used as a measure of how similar two gain vectors are. Note, however, that other approaches may be used to generate values representing the similarities of gain vectors associated with GNSS signals.

Once the similarity values for the gain vectors have been determined, the similarity values can be compared with a threshold. If a similarity value exceeds the threshold, this is indicative that the GNSS signals associated with the gain vectors used to compute the similarity value may be spoofed, and any GNSS signals identified as being possibly spoofed may be suppressed. Note that a similarity value exceeding the threshold may also be indicative that two satellites 102 broadcasting valid position signals 104 were (temporarily) close to one another in the sky at the time the GNSS signals were captured. Given that, some embodiments may require that the number of possibly-spoofed GNSS signals exceed some specified value (such as at least three or at least four) before those GNSS signals are suppressed. In other embodiments, it may be possible to suppress two GNSS signals based on their similarity value if an adequate number of GNSS signals can be received from other satellites 102. Also, it is possible for multiple spoofers to transmit multiple spoofed signals 110, 114, and the techniques described here can be used to suppress spoofed signals 110, 114 transmitted from multiple spoofers.

In the example shown in FIG. 3, the processor 204 uses the identification of genuine and spoofed GNSS signals to control amplitude and phase adjusters 332. The amplitude and phase adjusters 332 are configured to weight GNSS signals from the different antenna elements 302a-302n differently. For example, the amplitude and phase adjusters 332 can weight genuine GNSS signals more and discard, block, or otherwise suppress spoofed GNSS signals by weighting the GNSS signals less. The amplitude and phase adjusters 332 can also adjust the phases of the same GNSS signal received by different antenna elements 302a-302n so that the phases of that GNSS signal are aligned. Each of the amplitude and phase adjusters 332 includes any suitable structure for adjusting the amplitude and phase of a signal, such as a weighting network. Note that the signals received by the amplitude and phase adjusters 332 may represent the pre-processed GNSS signals. Also note that the processor 204 can use the identification of genuine and spoofed GNSS signals in other ways, such as to identify a direction to a potential or actual spoofer based on the gain vectors that are determined to be substantially similar.

The resulting signals from the amplitude and phase adjusters 332 are provided to a combiner 334, which combines the signals. For example, the combiner 334 may multiplex the genuine GNSS signals onto the same carrier frequency or frequencies on which the original GNSS signals were received. Ideally, the output of the combiner 334 is an antenna pattern that optimizes the reception of legitimate GNSS signals and suppresses potential or actual spoofed GNSS signals. The combiner 334 includes any suitable structure for combining signals, such as a multiplexer. The final signal output from the combiner 334 can be provided to any suitable destination, such as the GNSS receiver 206 or the processor 204 for use in identifying a location.

This disclosure recognizes that, by comparing the gain vectors of the received GNSS signals, it can be determined that two or more GNSS signals may be spoofed if they have substantially the same gain vectors. The threshold used for comparing the gain vector similarities can be chosen to give a proper balance between maximizing the detection of spoofed GNSS signals and minimizing the false positive rate that may be caused by a temporary coincidence of angles of arrival of genuine GNSS signals as satellite positions change.

In addition to determining if multiple gain vectors are substantially the same, similarities between the gain vectors of the received GNSS signals and expected gain vectors associated with expected satellite positions can be determined, where those expected satellite positions are based on an almanac (such as the GPS almanac) or previously-received ephemerides. In some embodiments, the almanac may be calculated and loaded off-line into the memory 208, such as separate from the received GNSS signals, since the orbits of the satellites 102 are well-known and cannot easily be changed. In other embodiments, the almanac or the ephemerides can be obtained from the received GNSS signals and stored in the memory 208. However obtained, if the computed gain vectors of the received GNSS signals are not substantially similar to the expected gain vectors, it is likely that at least one of the GNSS signals is spoofed. Similarly, if the ephemeris of a given satellite 102 changes abruptly or does not change significantly over time, this can also be an indication that a signal is spoofed. The processor 204 may therefore include a GNSS receiver or other suitable circuitry or programming in order to acquire the GNSS almanac or ephemerides.

By using information associated with the expected positions of the GNSS satellites 102 in conjunction with the comparison of the gain vectors associated with two or more incoming GNSS signals, this provides increased confidence or verification of genuine GNSS signals. Also, the use of the expected positions of the GNSS satellites 102 (whether based on elevation, an almanac, ephemerides, or other data) helps to speed up the anti-spoofing detection process since the device 200 may only search for GNSS signals that originate from satellites 102 expected to be visible (above the horizon). In this way, no time or resources may be wasted attempting to lock onto genuine GNSS signals that are not capable of being received, and no time or resources may be spent attempting to verify received GNSS signals that appear to be from satellites 102 that should not be visible.

As noted above, in addition to identifying and using the gain vectors, the processor 204 may use additional information in attempting to identify spoofed GNSS signals. For example, the signal strength of a received GNSS signal can be compared with an expected signal strength (such as a threshold of −120 dBm or lower). If a received GNSS signal has a received signal strength that exceeds this threshold, the GNSS signal can be identified as being a spoofed signal.

Although FIG. 3 illustrates one example of the signal processing in a device supporting GNSS anti-spoofing based on similarities of gain vectors, various changes may be made to FIG. 3. For example, various components shown in FIG. 3 may be combined, further subdivided, or omitted and additional components may be added according to particular needs. As a particular example, the various components 304, 332, 334 shown in FIG. 3 may be incorporated into the processor 204. Also, if the processor 204 is analyzing the legitimate GNSS signals to identify a position, there may be little or no need to multiplex or otherwise combine the weighted/adjusted GNSS signals (since the processor 204 may simply process the weighted/adjusted GNSS signals). In addition, the operations performed by the processor 204 do not necessarily need to be carried out by a single device, and some tasks may be off-loaded to one or more other processors.

Figure 4:
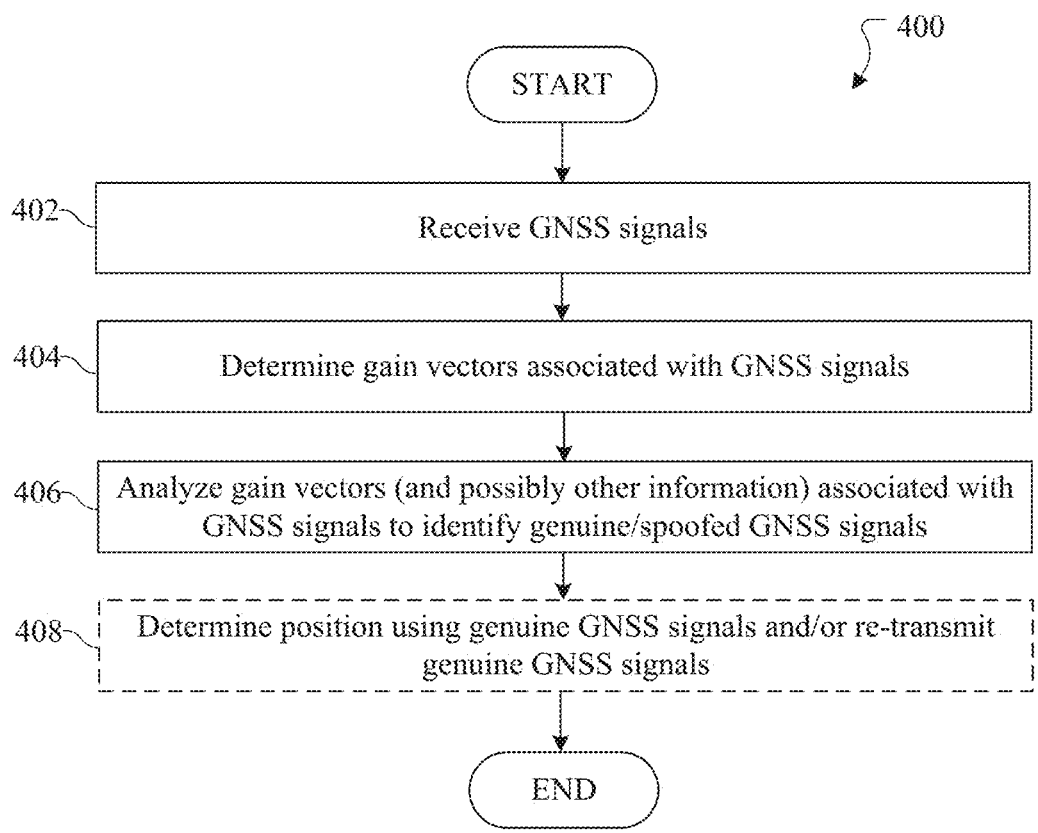
FIG. 4 illustrates an example method for GNSS anti-spoofing based on similarities of gain vectors according to this disclosure.

FIG. 4 illustrates an example method 400 for GNSS anti-spoofing based on similarities of gain vectors according to this disclosure. For ease of explanation, the method 400 of FIG. 4 is described as involving the use of the device 200 of FIG. 2 in the GNSS 100 of FIG. 1. However, the method 400 may involve the use of any other suitable device operating in any other suitable system.

As shown in FIG. 4, multiple GNSS signals are received at step 402. This may include, for example, multiple position signals 104 being received from multiple satellites 102 using the antenna elements 302a-302n of the multi-element antenna 202. This may also include one or more spoofed position signals 110, 114 possibly being received from one or more spoofers using the antenna elements 302a-302n of the antenna 202. This may further include the device 200 performing any desired pre-processing operations, such as filtering and amplifying the received GNSS signals.

Gain vectors for the received GNSS signals are determined at step 404. This may include, for example, the tracking channels 304 processing the received GNSS signals as described above and generating sets of accumulated values representing vectors of values. This may also include the processor 204 processing the vectors of values to generate gain vectors for the GNSS signals. In some embodiments, the processor 204 may use Equation (1) above to generate the gain vectors, although other approaches may also be used to generate the gain vectors. As noted above, this process can be shortened by attempting to lock onto and process only those GNSS signals transmitted by satellites 102 that should be visible to the antenna 202. This can be based on ephemerides or an almanac previously downloaded or otherwise obtained by the device 200.

The gain vectors are analyzed to determine which of the received GNSS signals is legitimate and which of the received GNSS signals (if any) may be spoofed at step 406. This may include, for example, the processor 204 calculating similarity values, where each similarity value is associated with a similarity of two or more of the calculated gain vectors. In some embodiments, the processor 204 may use Equation (2) above to generate the similarity values between pairs of gain vectors, although other approaches may also be used to generate the similarity values. This may also include the processor 204 determining whether any of the similarity values exceeds a threshold and determining whether at least a specified number of GNSS signals (such as at least three or at least four) GNSS signals are associated with similarity values exceeding the threshold. Other analyses may also be performed, such as by comparing the received signal strength of each GNSS signal to a threshold value and identifying any GNSS signal having an excessive signal strength as being spoofed.

The identification of the legitimate and spoofed GNSS signals may be used in any suitable manner. For example, a location of the device can be determined or any genuine GNSS signals can be re-transmitted for use in determining the location of the device at step 408. In some embodiments, this may include the processor 204 using the legitimate GNSS signals to identify the position of the device 200. In other embodiments, this may include the amplitude and phase adjusters 332 adjusting the legitimate GNSS signals and the combiner 334 combining the legitimate GNSS signals for output to a GNSS receiver 206 or other destination. The legitimate GNSS signals may be weighted more heavily and aligned in phase using the amplitude and phase adjusters 332. Any spoofed GNSS signals may simply be discarded or blocked, such as by appropriate weighting of the amplitude and phase adjusters 332. In particular implementations, any spoofed GNSS signals may be discarded or blocked using one or more null steering techniques, such as those described in Monzingo et al., "Introduction to Adaptive Arrays" (John Wiley 1980), which is hereby incorporated by reference. This may be sufficient in a scenario where a sufficient number of genuine GNSS signals (such as four GNSS signals) can still be properly received and used to calculate a position. In this manner, the processor 204 may re-transmit genuine GNSS signals to a separate GNSS receiver 206 as described above, or the processor 204 itself may be configured to calculate a position from the genuine GNSS signals. As another example, the processor 204 may use the gain vectors that are substantially similar to identify one or more directions to one or more potential or actual spoofers.

Although FIG. 4 illustrates one example of a method 400 for GNSS anti-spoofing based on similarities of gain vectors, various changes may be made to FIG. 4. For example, while shown as a series of steps, various steps in FIG. 4 may overlap, occur in parallel, or occur any number of times.

Figure 5:
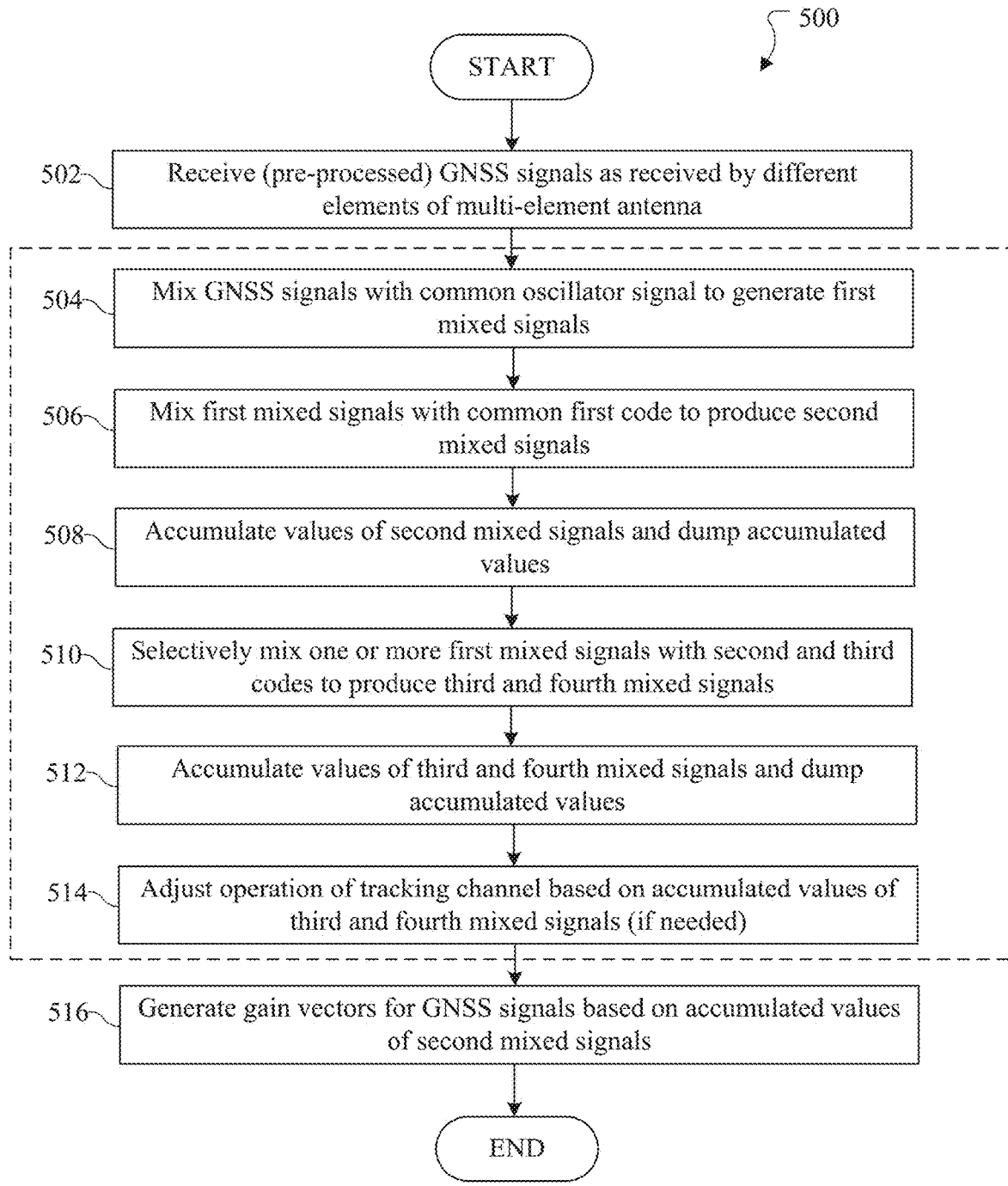
FIG. 5 illustrates an example method for processing signals to support GNSS anti-spoofing based on similarities of gain vectors according to this disclosure.

FIG. 5 illustrates an example method 500 for processing signals to support GNSS anti-spoofing based on similarities of gain vectors according to this disclosure. More specifically, the method 500 shown in FIG. 5 may be performed during step 404 in the method 400 of FIG. 4 to identify the gain vectors for GNSS signals. For ease of explanation, the method 500 of FIG. 5 is described as involving the use of the device 200 of FIG. 2 in the GNSS 100 of FIG. 1. However, the method 500 may involve the use of any other suitable device operating in any other suitable system.

As shown in FIG. 5, multiple (possibly pre-processed) GNSS signals are received at step 502. This may include, for example, the tracking channels 304 receiving electrical signals from the antenna elements 302a-302n of the multi-element antenna 202, possibly after any pre-processing operations have been performed (such as filtering and amplification).

Within each tracking channel 304, the following operations can occur. The received GNSS signals are mixed with a common oscillator signal to produce first mixed signals at step 504. This may include, for example, the mixers 308a-308n mixing the received GNSS signals with the oscillator signal from the controllable oscillator 314. The first mixed signals are mixed with a common first GNSS code to produce second mixed signals at step 506. This may include, for example, the mixers 310a-310n mixing the first mixed signals with the punctual GNSS code from the GNSS code generator 326. As noted above, different tracking channels 304 can use different GNSS codes to detect signals from different satellites 102. Values of the second mixed signals are accumulated and dumped at step 508. This may include, for example, the accumulators 312a-312n repeatedly (i) integrating the values of the second mixed signals over a time period and (ii) outputting the integrated values at the end of the time period. One or more of the first mixed signals is also selectively mixed with second and third GNSS codes to produce third and fourth mixed signals at step 510. This may include, for example, the multiplexer 316 outputting one of the first mixed signals (such as the first mixed signal associated with the antenna element selected as the reference). This may also include the mixers 318 and 320 mixing the selected signal with the early and late GNSS codes from the GNSS code generator 326. Values of the third and fourth mixed signals are accumulated and dumped at step 512, and the tracking channel can be adjusted based on the accumulated values of the third and fourth mixed signals (if necessary) at step 514. This may include, for example, the accumulators 322 and 324 repeatedly (i) integrating the values of the third and fourth mixed signals over a time period and (ii) outputting the integrated values at the end of the time period. This may also include adjusting the timing of the tracking channel 304 based on whether the early or late code correlates better with the received GNSS signal than the punctual code.

Gain vectors for the GNSS signals are generated based on the accumulated values of the second mixed signals at step 516. This may include, for example, the processor 204 processing vectors of values (each vector represented by the accumulated values output by the accumulators 312a-312n in one of the tracking channels 304) to generate gain vectors for the GNSS signals. In some embodiments, the processor 204 may use Equation (1) above to generate the gain vectors, although other approaches may also be used to generate the gain vectors. Again, this process can be shortened by attempting to lock onto and process only those GNSS signals transmitted by satellites 102 that should be visible to the antenna 202, such as based on ephemerides or an almanac.

Although FIG. 5 illustrates one example of a method 500 for processing signals to support GNSS anti-spoofing based on similarities of gain vectors, various changes may be made to FIG. 5. For example, while shown as a series of steps, various steps in FIG. 5 may overlap, occur in parallel, or occur any number of times.

Figure 6:
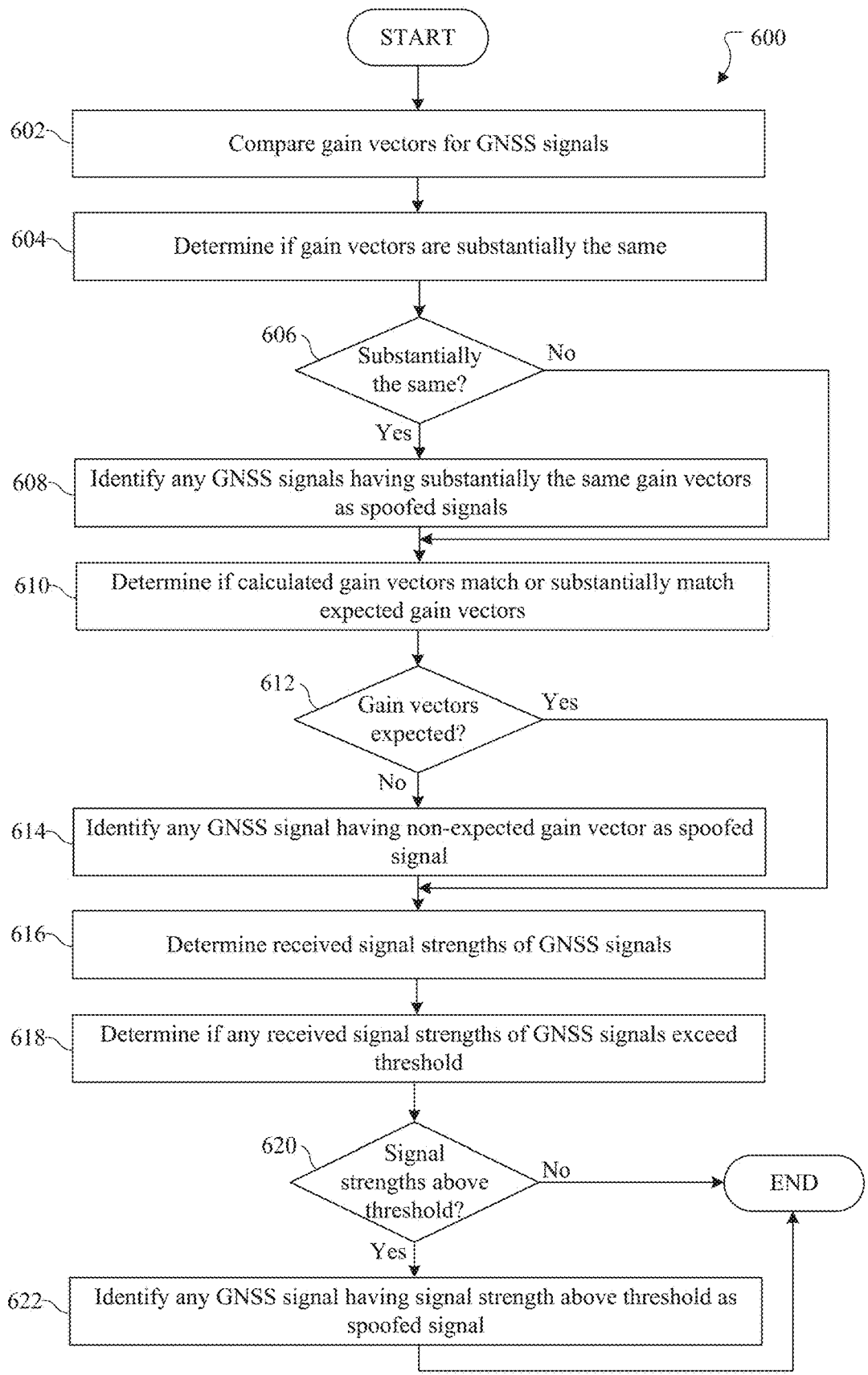
FIG. 6 illustrates an example method for analyzing signals to support GNSS anti-spoofing based on similarities of gain vectors according to this disclosure.

FIG. 6 illustrates an example method 600 for analyzing signals to support GNSS anti-spoofing based on similarities of gain vectors according to this disclosure. More specifically, the method 600 shown in FIG. 6 may be performed during step 406 in the method 400 of FIG. 4 to process the determined gain vectors for GNSS signals. For ease of explanation, the method 600 of FIG. 6 is described as involving the use of the device 200 of FIG. 2 in the GNSS 100 of FIG. 1. However, the method 600 may involve the use of any other suitable device operating in any other suitable system.

As shown in FIG. 6, the gain vectors for multiple GNSS signals are compared at step 602, and a determination is made if multiple gain vectors are substantially the same at step 604. This may include, for example, the processor 204 calculating similarity values and comparing the similarity values to a threshold. In some embodiments, the processor 204 may use Equation (2) above to generate the similarity values between pairs of gain vectors, although other approaches may also be used to generate the similarity values. This may also include the processor 204 determining whether at least a specified number of GNSS signals (such as at least three or at least four) GNSS signals are associated with similarity values exceeding the threshold. If there are multiple gain vectors that are substantially the same at step 606, the associated GNSS signals are identified as spoofed signals at step 608. This may include, for example, the processor 204 flagging the associated GNSS signals as being invalid, configuring the amplitude and phase adjusters 332 to lower the weights on, discard, block, or otherwise suppress the associated GNSS signals, or configuring the combiner 334 to omit the associated GNSS signals from its combined output.

A determination is made if the calculated gain vectors are substantially the same as expected gain vectors at step 610. This may include, for example, the processor 204 calculating similarity values between the calculated gain vectors and expected gain vectors and comparing the similarity values to a threshold. The expected gain vectors can be determined in any suitable manner, such as based on platform attitude, a rough location of the receiver 106 or azimuths and elevations obtained from a GNSS receiver, and an antenna array manifold. Again, in some embodiments, the processor 204 may use Equation (2) above to generate the similarity values between pairs of gain vectors, although other approaches may also be used to generate the similarity values. If there are any calculated gain vectors that do not substantially match the expected gain vectors at step 612, the GNSS signal or signals associated with the calculated gain vector(s) are identified as spoofed signals at step 614. This may include, for example, the processor 204 flagging the associated GNSS signals as being invalid, configuring the amplitude and phase adjusters 332 to lower the weights on, discard, block, or otherwise suppress the associated GNSS signals, or configuring the combiner 334 to omit the associated GNSS signals from its combined output.

Received signal strengths of the GNSS signals are determined at step 616, and a determination is made if any GNSS signal has a signal strength above some threshold value at step 618. This may include, for example, the processor 204 measuring the received signal strengths or receiving measured signal strengths from the tracking channels 304 or other components. This may also include the processor 204 comparing the received signal strengths to a suitable threshold value, such as −120 dBm or lower. If there are any received signal strengths that exceed the threshold at step 620, the associated GNSS signal or signals are identified as spoofed signals at step 622. Again, this may include the processor 204 flagging the associated GNSS signals as being invalid, configuring the amplitude and phase adjusters 332 to lower the weights on, discard, block, or otherwise suppress the associated GNSS signals, or configuring the combiner 334 to omit the associated GNSS signals from its combined output.

Although FIG. 6 illustrates one example of a method 600 for analyzing signals to support GNSS anti-spoofing based on similarities of gain vectors, various changes may be made to FIG. 6. For example, while shown as a series of steps, various steps in FIG. 6 may overlap, occur in parallel, or occur any number of times. As a particular example, the different tests of the GNSS signals may occur in parallel. Also, gain vectors or other characteristics of the received GNSS signals may be used in any other or additional manner to identify spoofed GNSS signals.

The GNSS anti-spoofing functionality described above can be used in various ways and in various applications or environments. For example, the GNSS anti-spoofing functionality may be used in civilian or military land vehicles, water vessels, or flight vehicles to ensure that the locations of the vehicles or vessels can be accurately determined. This may be important in various scenarios, such as to ensure that land vehicles, water vessels, or flight vehicles do not cross borders or otherwise enter restricted areas. Similarly, the GNSS anti-spoofing functionality may be used in civilian or military handheld devices to ensure that the locations of the handheld devices can be accurately determined. In addition, the GNSS anti-spoofing functionality may be used in autonomous vehicles to help ensure that accurate positions of the vehicles can be determined in order to improve the safety of the vehicles, which is increasingly becoming a concern (particularly for land-based autonomous passenger vehicles). While the following describes one specific application for the GNSS anti-spoofing functionality, this functionality may be used in any other suitable manner.

Figure 7:
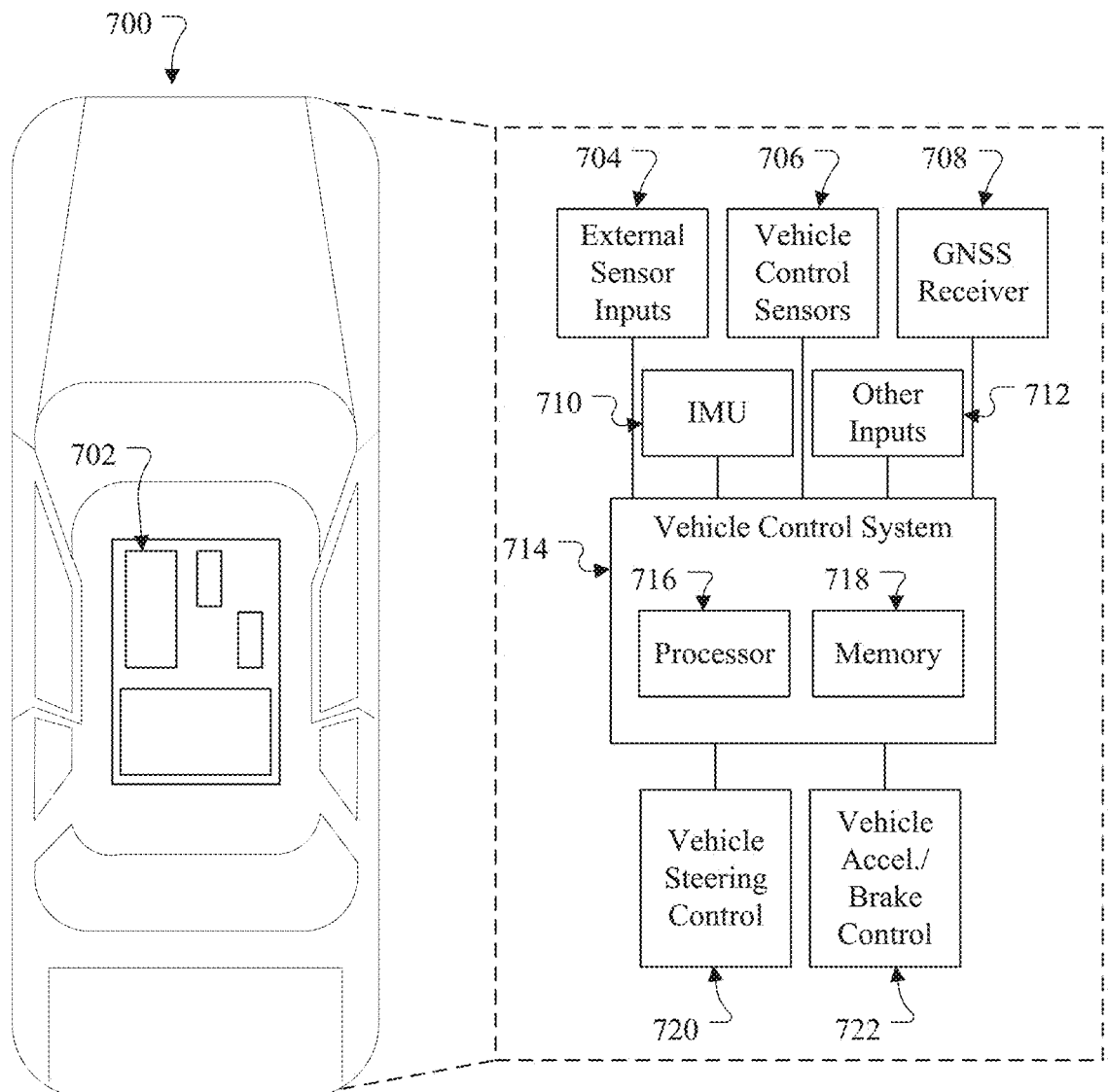
FIG. 7 illustrates an example autonomous vehicle supporting GNSS anti-spoofing based on similarities of gain vectors according to this disclosure.

FIG. 7 illustrates an example autonomous vehicle 700 supporting GNSS anti-spoofing based on similarities of gain vectors according to this disclosure. In this example, the autonomous vehicle 700 here has the form of a passenger car, such as a sedan or other smaller passenger vehicle. However, the autonomous vehicle 700 may represent any other suitable type of passenger vehicle or other autonomous vehicle. Other types of vehicles that may be used here include sport utility vehicles (SUVs), pickup trucks, semi-trucks (tractor-trailers), autonomous shuttles or autonomous buses (such as those used in theme parks, airports, retirement communities, or other locations), or autonomous underwater vehicles or autonomous flight vehicles that may use GNSS-based navigation in some manner.

As shown in FIG. 7, the autonomous vehicle 700 may include one or more externally-mounted sensors 702. There are various types of externally-mounted sensors 702 known in the field of autonomous driving, and various other types of externally-mounted sensors 702 are sure to be developed in the future. Some example types of externally-mounted sensors 702 include visible cameras, infrared/thermal cameras, radio detection and ranging (RADAR) systems, light detection and ranging (LiDAR) systems, and ultrasonic sensors. In this example, multiple externally-mounted sensors 702 are mounted to the roof of the autonomous vehicle 700, although each of the externally-mounted sensors 702 may be mounted in any suitable location on the vehicle 700. In many instances, some or all of the externally-mounted sensors 702 for an autonomous vehicle 700 can be packaged into a single structure that is mounted to the roof of the vehicle 700, although this is not required.

The autonomous vehicle 700 also includes various additional components within the vehicle 700 itself. For example, the autonomous vehicle 700 here includes various sources of input data for use in controlling the operation of the vehicle 700. In this particular example, the sources of input data include one or more external sensor inputs 704, which are configured to be coupled to the externally-mounted sensors 702 and to receive input data from the externally-mounted sensors 702. The sources of input data also include one or more vehicle control sensors 706, which can measure and provide various data about controls of the autonomous vehicle 700. For instance, the vehicle control sensors 706 may measure and provide the current positions of the steering wheel, gear shift, brake pedal, and gas pedal (accelerator) of the vehicle 700. The sources of input data further include a GNSS receiver 708 (such as a GPS receiver), which can be used to identify the geo-spatial location of the vehicle 700. In addition, the sources of input data include an inertial measurement unit (IMU) 710, which often includes one or more gyroscopes or one or more accelerometers. Any other or additional sources 712 of input data can also be used in the vehicle 700.

The various input data is provided to a vehicle control system 714, which uses the input data to determine how to control the autonomous vehicle 700. For example, the vehicle control system 714 may use input data from the externally-mounted sensors 702 to identify information about the vehicle's surroundings and any obstacles that might be detected in the travel path of the vehicle 700. The vehicle control system 714 may use input data from the vehicle control sensors 706 to determine how much the control system 714 is able to adjust the steering wheel, gear shift, brake pedal, and gas pedal positions, to confirm whether certain actions initiated by the vehicle control system 714 have been performed, and to detect if a driver of the vehicle 700 is attempting to take control of the vehicle

700. The vehicle control system 714 may use input data from the GNSS receiver 708 to identify the current position of the vehicle 700 on a map for one or more occupants, to determine the best route to take in order to reach a desired destination, or to cause the vehicle 700 to follow a preprogrammed course. The vehicle control system 714 may use input data from the IMU 710 to sense roll-overs or other accidents, to sense how quickly the vehicle 700 accelerates or decelerates, or to supplement position data from the GNSS receiver 708 when the GNSS receiver 708 temporarily loses the ability to receive position signals (which is often referred to as "dead reckoning capability"). Note, however, that these uses for input data are examples only and that the vehicle control system 714 can use input data in any suitable manner to perform any desired functions.

The vehicle control system 714 in this example includes at least one processor 716 and at least one memory 718. The at least one processor 716 processes the various input data in order to determine how to control the operation of the autonomous vehicle 700. The at least one memory 718 can store and facilitate retrieval of the data used by the processor 716. The at least one memory 718 may also store instructions executed by the processor 716.

The vehicle control system 714 interacts with various actuators or other individual control systems to control various aspects of the vehicle's operation. For example, the vehicle control system 714 may be used to control a vehicle steering control system 720, which controls the turning of the steering wheel of the vehicle 700. As another example, the vehicle control system 714 may be used to control a vehicle acceleration/braking control system 722, which controls the brake pedal and the gas pedal of the vehicle 700 to control acceleration and deceleration of the vehicle 700. Note, however, that the vehicle control system 714 can be used to control any other suitable operations of the vehicle 700, such as by interacting with other subsystems to control use of the vehicle's headlights, turn signals, windshield wipers, or other components of the vehicle 700.

The autonomous vehicle 700 here can include or support the GNSS anti-spoofing functionality based on similarities of gain vectors described above. For example, the GNSS receiver 708 may be implemented using the device 200 shown in FIG. 2 and described above (along with the related functionality described above with respect to other figures). Note that the processor 204 and memory 208 may be implemented separate from the processor 716 and memory 718 of the vehicle control system 714, although this is not required. The ability to combat GNSS spoofing allows the autonomous vehicle 700 to operate in a safer and more reliable manner. For instance, the use of the GNSS anti-spoofing functionality described above may help to prevent an illicit actor from spoofing GNSS signals to misdirect the autonomous vehicle 700 to an undesired location. The use of the GNSS anti-spoofing functionality described above may also help to prevent an illicit actor from spoofing GNSS signals to cause erratic behavior of an autonomous vehicle 700, such as when GNSS signals are spoofed to try and cause the vehicle 700 to make course corrections based on an incorrect current location of the vehicle 700.

Although FIG. 7 illustrates one example of an autonomous vehicle 700 supporting GNSS anti-spoofing based on similarities of gain vectors, various changes may be made to FIG. 7. For example, any suitable vehicle having any suitable form may be used with GNSS anti-spoofing. Also, the autonomous vehicle 700 may include any suitable sensors or other sources of input data used to control any suitable aspects of the autonomous vehicle 700.

Figure 8:
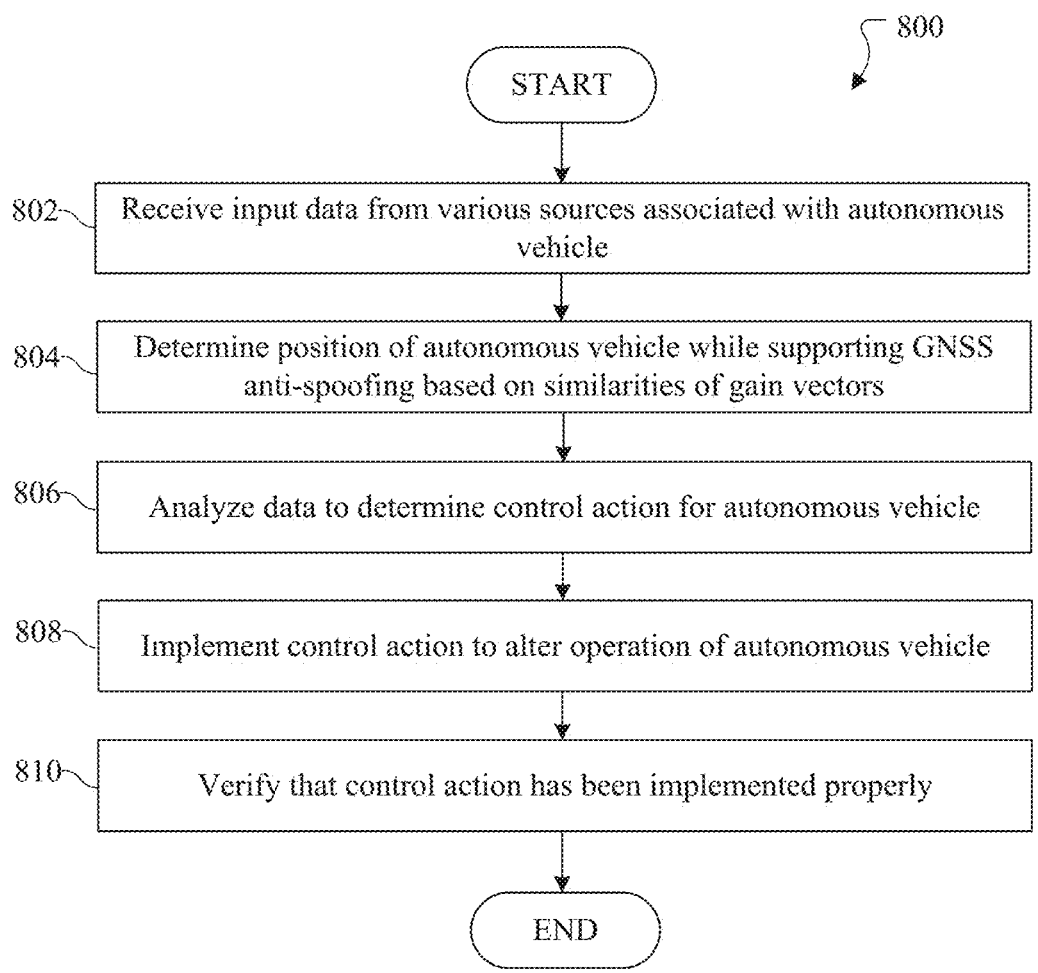
FIG. 8 illustrates an example method for using GNSS anti-spoofing based on similarities of gain vectors in an autonomous vehicle according to this disclosure.

FIG. 8 illustrates an example method 800 for using GNSS anti-spoofing based on similarities of gain vectors in an autonomous vehicle according to this disclosure. For ease of explanation, the method 800 of FIG. 8 is described as involving the device 200 of FIG. 2 in the autonomous vehicle 700 of FIG. 7. However, the method 800 may involve the use of any suitable GNSS-based device or system operating in any suitable autonomous vehicle.

As shown in FIG. 8, input data is received from various sources associated with an autonomous vehicle at step 802. This may include, for example, the vehicle control system 714 of the autonomous vehicle 700 receiving input data from sources like externally-mounted sensors 702 (via external sensor inputs 704), vehicle control sensors 706, or an IMU 710.

A position of the autonomous vehicle is determined while supporting GNSS anti-spoofing based on similarities of gain vectors at step 804. This may include, for example, the GNSS receiver 708 using the techniques discussed above to identify legitimate GNSS signals while discarding, blocking, or otherwise suppressing spoofed GNSS signals. This may also include the GNSS receiver 708 using the legitimate GNSS signals to identify the geo-spatial location of the autonomous vehicle 700. This may further include the GNSS receiver 708 providing the determined location to the vehicle control system 714. As noted above, however, there may be instances where the vehicle control system 714 determines its own location based on received GNSS signals without the need for a separate GNSS receiver 708.

The various data is analyzed to identify at least one control action for the autonomous vehicle at step 806. This may include, for example, the processor 716 of the vehicle control system 714 analyzing the various input data to determine whether to cause the autonomous vehicle 700 to turn, accelerate, decelerate, or perform some other function. This may also include the processor 716 of the vehicle control system 714 using the identified location of the autonomous vehicle 700 in some way, such as to verify whether the autonomous vehicle 700 is following a desired route or to calculate a new route to a desired destination. The at least one control action is implemented at step 808, and a verification that the at least one control action was actually implemented is made at step 810. This may include, for example, the processor 716 of the vehicle control system 714 outputting control signals or other commands to the vehicle steering control system 720, vehicle acceleration/braking control system 722, or other subsystem or subsystems of the autonomous vehicle 700. This may also include the processor 716 of the vehicle control system 714 using additional input data from one or more sensors or other components to verify that the desired control action or actions have been performed correctly.

Although FIG. 8 illustrates one example of a method 800 for using GNSS anti-spoofing based on similarities of gain vectors in an autonomous vehicle, various changes may be made to FIG. 8. For example, while shown as a series of steps, various steps in FIG. 8 may overlap, occur in parallel, or occur any number of times. Also, it should be noted that different control actions may or may not involve the use of the location of the autonomous vehicle 700.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims includes means-plus-function elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves and is not intended to represent means-plus-function elements.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the scope of this disclosure, as defined by the following claims.

What is claimed is:

1. A method for identifying spoofed navigation signals, the method comprising:
    receiving a plurality of navigation signals at a multi-element antenna;
    in each of multiple tracking channels:
        mixing, with a plurality of first mixers, the navigation signals as received by different elements of the multi-element antenna with an oscillator signal to produce first mixed signals;
        mixing, with a plurality of second mixers, the first mixed signals with a navigation code to produce second mixed signals, different tracking channels using different navigation codes; and
        accumulating, with a plurality of accumulators, values of the second mixed signals to produce accumulated values, the accumulated values forming a vector of values;
    determining gain vectors for the navigation signals, each gain vector calculated using a formula of $g_i = c/c_{ref}$, wherein $g_i$ represents a gain vector for an $i^{th}$ navigation signal, c represents the vector of values output from a single one of the tracking channels associated with the $i^{th}$ navigation signal, and $c_{ref}$ represents the accumulated value output from one of the accumulators associated with the single tracking channel; and
    analyzing the gain vectors for the navigation signals to determine whether one or more of the navigation signals are spoofed.

2. The method of claim 1, wherein analyzing the gain vectors for the navigation signals comprises:
    determining whether at least a specified number of the navigation signals have substantially the same gain vectors; and
    in response to determining that at least the specified number of the navigation signals have substantially the same gain vectors, determining that the navigation signals having substantially the same gain vectors are spoofed.

3. The method of claim 2, wherein two of the gain vectors are substantially the same when a squared cross-correlation magnitude between the two gain vectors exceeds a specified threshold.

4. The method of claim 1, further comprising:
    receiving information about expected or actual positions of satellites associated with the navigation signals; and
    using the information about the expected or actual positions of the satellites to at least one of: identify the navigation signals and analyze the gain vectors.

5. The method of claim 1, further comprising:
    comparing a signal strength of each of the navigation signals to an expected signal strength.

6. The method of claim 1, further comprising:
    suppressing any of the navigation signals determined to be spoofed.

7. The method of claim 6, further comprising at least one of:
    calculating a position using the navigation signals determined not to be spoofed; and
    re-transmitting the navigation signals determined not to be spoofed to a navigation receiver.

8. A system for identifying spoofed navigation signals, the system comprising:
    a multi-element antenna configured to receive a plurality of navigation signals;
    multiple tracking channels, each tracking channel configured to:
        mix, with a plurality of first mixers, the navigation signals as received by different elements of the multi-element antenna with an oscillator signal to produce first mixed signals;
        mix, with a plurality of second mixers, the first mixed signals with a navigation code to produce second mixed signals, different tracking channels configured to use different navigation codes; and accumulate, with a plurality of accumulators, values of the second mixed signals to produce accumulated values, the accumulated values forming a vector of values; and at least one processor configured to:
obtain gain vectors for the navigation signals, each gain vector calculated using a formula of $g_i=c/c_{ref}$, wherein $g_i$ represents a gain vector for an $i^{th}$ navigation signal, c represents the vector of values output from a single one of the tracking channels associated with the $i^{th}$ navigation signal, and $c_{ref}$ represents the accumulated value output from one of the accumulators associated with the single tracking channel; and analyze the gain vectors for the navigation signals to determine whether one or more of the navigation signals are spoofed.

9. The system of claim 8, wherein, to analyze the gain vectors for the navigation signals, the at least one processor is configured to:
determine whether at least a specified number of the navigation signals have substantially the same gain vectors; and
in response to determining that at least the specified number of the navigation signals have substantially the same gain vectors, determine that the navigation signals having substantially the same gain vectors are spoofed.

10. The system of claim 8, wherein the at least one processor is further configured to:
receive information about expected or actual positions of satellites associated with the navigation signals; and
use the information about the expected or actual positions of the satellites to at least one of: identify the navigation signals and analyze the gain vectors.

11. The system of claim 8, wherein the at least one processor is further configured to compare a signal strength of each of the navigation signals to an expected signal strength.

12. The system of claim 8, wherein the at least one processor is further configured to suppress any of the navigation signals determined to be spoofed.

13. The system of claim 12, wherein the at least one processor is further configured to at least one of:
calculate a position using the navigation signals determined not to be spoofed; and
re-transmit the navigation signals determined not to be spoofed to a navigation receiver.

14. A non-transitory computer-readable medium comprising instructions that, when executed by at least one processor, cause the at least one processor to:
in each of multiple tracking channels:
mix, with a plurality of first mixers, navigation signals as received by different elements of a multi-element antenna with an oscillator signal to produce first mixed signals;
mix, with a plurality of second mixers, the first mixed signals with a navigation code to produce second mixed signals, different tracking channels configured to use different navigation codes; and
accumulate, with a plurality of accumulators, values of the second mixed signals to produce accumulated values, the accumulated values forming a vector of values;

determine gain vectors for the navigation signals, each gain vector calculated using a formula of $g_i=c/c_{ref}$, wherein $g_i$ represents a gain vector for an $i^{th}$ navigation signal, c represents the vector of values output from a single one of the tracking channels associated with the $i^{th}$ navigation signal, and $c_{ref}$ represents the accumulated value output from one of the accumulators associated with the single tracking channel; and analyze the gain vectors for the navigation signals to determine whether one or more of the navigation signals are spoofed.

15. The non-transitory computer-readable medium of claim 14, wherein the instructions that when executed cause the at least one processor to analyze the gain vectors for the navigation signals comprise:
instructions that when executed cause the at least one processor to:
determine whether at least a specified number of the navigation signals have substantially the same gain vectors; and
in response to determining that at least the specified number of the navigation signals have substantially the same gain vectors, determine that the navigation signals having substantially the same gain vectors are spoofed.

16. The non-transitory computer-readable medium of claim 14, wherein the instructions when executed further cause the at least one processor to:
receive information about expected or actual positions of satellites associated with the navigation signals; and
use the information about the expected or actual positions of the satellites to at least one of: identify the navigation signals and analyze the gain vectors.

17. The non-transitory computer-readable medium of claim 14, wherein the instructions when executed further cause the at least one processor to compare a signal strength of each of the navigation signals to an expected signal strength.

18. The non-transitory computer-readable medium of claim 14, wherein the instructions when executed further cause the at least one processor to suppress any navigation signals determined to be spoofed.

19. The non-transitory computer-readable medium of claim 18, wherein the instructions when executed further cause the at least one processor to at least one of:
calculate a position using the navigation signals determined not to be spoofed; and
re-transmit the navigation signals determined not to be spoofed to a navigation receiver.

20. The method of claim 4, wherein the information about the expected or actual positions of the satellites comprises at least one of: a navigation almanac and ephemerides.

21. The method of claim 5, wherein the expected signal strength is −120 dBm or lower.

22. The method of claim 1, further comprising re-transmitting the navigation signals determined not to be spoofed to a navigation receiver by:
multiplexing the navigation signals determined not to be spoofed; and
re-transmitting the multiplexed navigation signals on a same carrier frequency or frequencies on which the navigation signals were received by the multi-element antenna.

* * * * *

UNITED STATES PATENT AND TRADEMARK OFFICE
CERTIFICATE OF CORRECTION

| | |
|---|---|
| PATENT NO. | : 11,391,846 B2 |
| APPLICATION NO. | : 17/066106 |
| DATED | : July 19, 2022 |
| INVENTOR(S) | : Michael Jones et al. |

It is certified that error appears in the above-identified patent and that said Letters Patent is hereby corrected as shown below:

On the Title Page

Column 1, Item (30), Line 1, "1914762" should read --1914762.8--.

Signed and Sealed this
Third Day of January, 2023

Katherine Kelly Vidal
Director of the United States Patent and Trademark Office